(12) United States Patent
Bieker

(10) Patent No.: US 6,578,506 B2
(45) Date of Patent: Jun. 17, 2003

(54) AFT HUNG HYDROFOIL FOR REDUCTION OF WATER RESISTANCE OF PARTIALLY IMMERSED SAILING VESSELS

(76) Inventor: Paul G. Bieker, 4207 NW. $3^{rd}$ Ave., Seattle, WA (US) 90187

( * ) Notice: Subject to any disclaimer, the term of this patent is extended or adjusted under 35 U.S.C. 154(b) by 0 days.

(21) Appl. No.: 09/885,748

(22) Filed: Jun. 19, 2001

(65) Prior Publication Data

US 2002/0040673 A1 Apr. 11, 2002

Related U.S. Application Data

(60) Provisional application No. 60/212,400, filed on Jun. 19, 2000.

(51) Int. Cl.[7] ................................................ B63B 35/00
(52) U.S. Cl. ...................... 114/39.24; 114/162; 114/274
(58) Field of Search ................................ 114/271, 274, 114/162, 280, 281, 282, 39.24

(56) References Cited

U.S. PATENT DOCUMENTS

| | | | | |
|---|---|---|---|---|
| 2,832,304 A | * | 4/1958 | Elyosius et al. | 114/280 |
| 3,345,968 A | * | 10/1967 | Bailey | 114/280 |
| 3,789,789 A | * | 2/1974 | Cleary | 114/280 |
| 4,027,614 A | * | 6/1977 | Jones | 114/163 |
| 5,315,951 A | | 5/1994 | Finkl | |
| 5,676,079 A | | 10/1997 | Depke | |
| 5,860,384 A | * | 1/1999 | Castillo | 114/274 |
| 6,012,408 A | * | 1/2000 | Castillo | 114/274 |

* cited by examiner

Primary Examiner—Stephen Avila
(74) Attorney, Agent, or Firm—Clark & Elbing LLP; Kristina Bieker-Brady

(57) ABSTRACT

The invention features a hydrofoil device for reducing wake formation on a partially immersed hull of a sailing or motor vessel.

16 Claims, 4 Drawing Sheets

AFT HUNG HYDROFOIL FOR REDUCTION OF WATER RESISTANCE OF PARTIALLY IMMERSED SAILING VESSELS

CROSS REFERENCE TO RELATED APPLICATIONS

This application claims priority from provisional patent application serial No. 60/212,400, filed on Jun. 19, 2000.

BACKGROUND OF THE INVENTION

One of the greatest impediments to speed and efficiency for water borne vessels is the loss of energy created by water resistance. One form of this loss of energy is the wake generation which occurs as a vessel passes through the water; the greater the wake, the greater the energy loss. Reducing this wave making resistance is an important way to improve the performance of a vessel. In the past, two primary methods have been used to reduce this component of resistance in a partially immersed hull with a given weight and speed. The first has been to increase the effective immersed length of the hull. The second has been to reduce the amount of water displaced by the hull on a given immersed length by separating the immersed volume into multiple hulls.

In the past, hydrofoils have been used on sailing craft as a way of to avoid many of the limitations of partially immersed hulls traveling through water. Most of these craft have been configured such that their weight is fully supported by the dynamic lift on their foils.

In addition hydrofoils have been fitted to craft traveling with partially immersed hulls. In sailing craft they have been used to control fore and aft trim in boats with narrow hulls that have relatively limited fore and aft stability, such as multiple hulled craft and International Moth class single hulled craft. In these cases the hydrofoils have been mounted to the rudder(s)of the vessels at a fixed angle to the hull(s) of the craft. As the moving craft pitches forward or aft, dynamic lift on the foil acts to return the craft to its designed trim angle. These foils have always been mounted deeper than the proposed invention and have not been designed to significantly affect the wave making resistance of the hulls on which they are attached.

There remains a need for vessels with partially immersed hulls to reduce the energy lost to wave making resistance. In the case of powerboats, reduced resistance would result in reduced fuel consumption and/or increased speed. In the case of sailing craft, reduced resistance would result in greater performance.

SUMMARY OF THE INVENTION

I have discovered a mechanism to significantly reduce the loss of energy due to wave making as the partially immersed hull of a single hulled craft moves through the water. This invention employs a hydrofoil submersed aft of the stern of the vessel, located near the surface of the water and capable of significant lift upwards. The effect of the hydrofoil is to reduce the amount of wake generated by the vessel when traveling through water and thereby reduce the energy lost to wake formation. The effect is to increase the performance, relative to a vessel lacking such a hydrofoil, for a given amount of propulsion energy applied to the vessel.

In the case of vessels that travel at a wide range of speeds (such as most high performance sailing craft), this hydrofoil may be configured so that its angle of attack relative to the hull may be adjusted.

The invention features a hydrofoil device for reducing wake formation on a partially immersed hull of a single hulled vessel. The hydrofoil device includes a transverse hydrofoil positioned below the surface of the water when said vessel is in the water, said hydrofoil being capable of a positive angle of attack of between 2 to 8 degrees to the static waterplane. The hydrofoil device further includes a strut or multiple struts for attaching said hydrofoil to said vessel, a means for attaching said hydrofoil to said strut or struts, and a means for attaching said strut or struts to said vessel.

In various preferred embodiments, the hydrofoil has an adjustable angle of attack, relative to the static waterplane of the vessel; the strut is the rudder of said vessel; the hydrofoil device is attached to said vessel by a single strut; the edges of the said hydrofoil are curved and do not lie within a single plane; the positive angle of attack is between 2 to 8 degrees; the leading edge of the hydrofoil has a length which is between 5% and 15% of the immersed length of the vessel aft of the transom of the vessel; the upper surface of the hydrofoil is between 5% and 15% of the immersed length of the vessel below the static waterplane of the vessel; the hydrofoil reduces the wake formation of said vessel when said vessel is moving, relative to a vessel lacking said hydrofoil.

The invention also features a method of reducing wake by attaching multiple hydrofoil devices featured by the invention to a vessel such that the transverse axis of one of the said hydrofoils may be horizontal when the vessel is heeled. In a preferred embodiment each of the hydrofoil devices is supported (attached to the haul) via a steering rudder which serves as the strut, such that there are multiple steering rudders on the vessel.

In an additional preferred embodiment, the vessel is a sailboat and said hydrofoil device is mounted to a vessel by means of a track device that allows said strut to be moved relative to the vertical axis of the transom of said sailboat such that the transverse axis of said hydrofoil may be more horizontal relative to the waterplane when said sailboat is heeled.

In yet another embodiment, the means for attaching the hydrofoil to the strut is a rotating means for the purpose of adjusting the angle of attack of said hydrofoil; the hydrofoil is rigidly attached to said strut and the means of attaching said strut to said hull is a rotating means for the purpose of adjusting the angle of attack of said hydrofoil; the vessel is a powerboat; the vessel is a sailboat; or the presence of the device on the vessel allows a reduction of wake of at least 50%, relative to a vessel lacking said device when said vessel is operating in Froude numbers from about 0.3 to 0.5.

"Waterplane" means the plane defined by the surface of the water.

"Static waterplane" means the waterplane, defined relative to the vessel, when the said vessel is floating stationary in calm water.

"Hydrofoil" means a surface designed to efficiently produce dynamic lifting force oriented approximately opposite to the direction of gravitational force as the vessel to which it is attached moves through the water.

"Span of the hydrofoil" means the dimension of the hydrofoil perpendicular to the direction of intended vessel motion and parallel to the waterplane of the vessel.

"Leading edge of the hydrofoil" means the edge of the hydrofoil closest to the bow of the vessel.

"Transverse axis of the hydrofoil" means the axis which both lies within the plane containing the edges of the hydrofoil and is perpendicular to the intended direction of water flow over the hydrofoil.

"Forward" means the direction of the intended direction of travel for the said vessel.

"Aft" means the direction opposite to the designed direction of travel for the said vessel.

"Stern" means the extreme aft end of the craft's hull.

"Angle of attack" means the angle at which the plane of the hydrofoil intersects the static waterplane of the vessel.

"Positive angle of attack" means an angle of attack at which the plane of the hydrofoil intersects the static waterplane forward of the leading edge of the foil.

"Negative angle of attack" means an angle of attack at which the plane of the hydrofoil intersects the static waterplane aft of the leading edge of the foil.

"Strut" means a structural support which supports the hydrofoil in its position relative to the vessel.

"Rudder" means a surface which is designed with the primary purpose of providing directional control to the said vessel.

"Partially immersed hull" means a hull that is intersected by the plane which contains the surface of the water, i.e. it is neither supported above the surface of the water nor submerged below the surface of the water.

DESCRIPTION OF THE PREFERRED EMBODIMENTS

Figure 1:
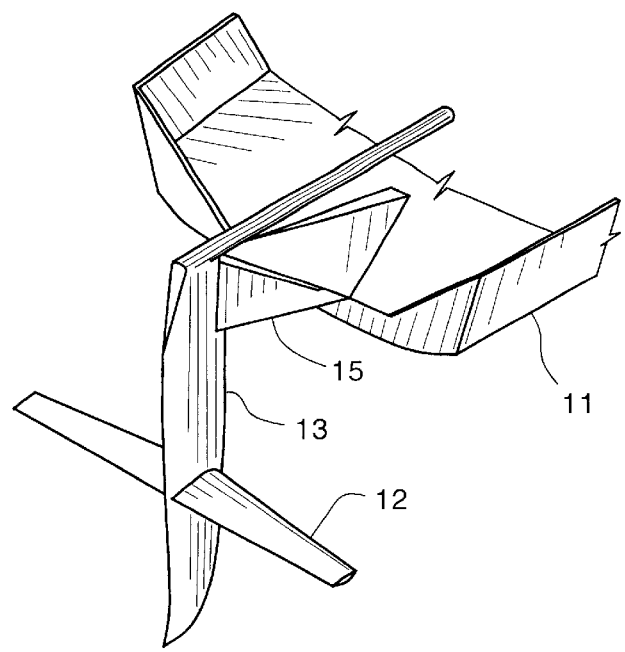
FIG. 1 shows an isometric view of the stem portion of a vessel with the invention fitted.

FIG. 1 is a partial isometric view of a boat fitted with the apparatus. In this Figure the apparatus shown is integrated with a steering rudder. This assembly includes the vessel hull (11), the structural connection between the vessel hull and the rudder (15), the rudder of the vessel (13), and the transverse hydrofoil.

Figure 2:
FIG. 2 shows a profile view of a small sailboat with the invention fitted.

FIG. 2 is a profile view of a complete sailboat fitted with the invention. In addition to the items noted in FIG. 1, this figure illustrates a representative static waterplane (14). It is anticipated that the preferred configuration will be to structurally support the hydrofoil by attaching it to the steering rudder of the vessel which in turn will be located aft of the stern of the vessel. However, in some vessels this will be impractical for structural and/or aesthetic reasons. In these cases the hydrofoil may be held in the preferred position using a streamlined strut or struts that are not designed as the primary mechanism to steer the vessel. Also, in ballasted sailing vessels that often sail with significant heel, it is anticipated that more than one of these foil assemblies may be fitted such that the span of the hydrofoil is approximately parallel with the waterplane of the vessel in its heeled position.

Figure 3:
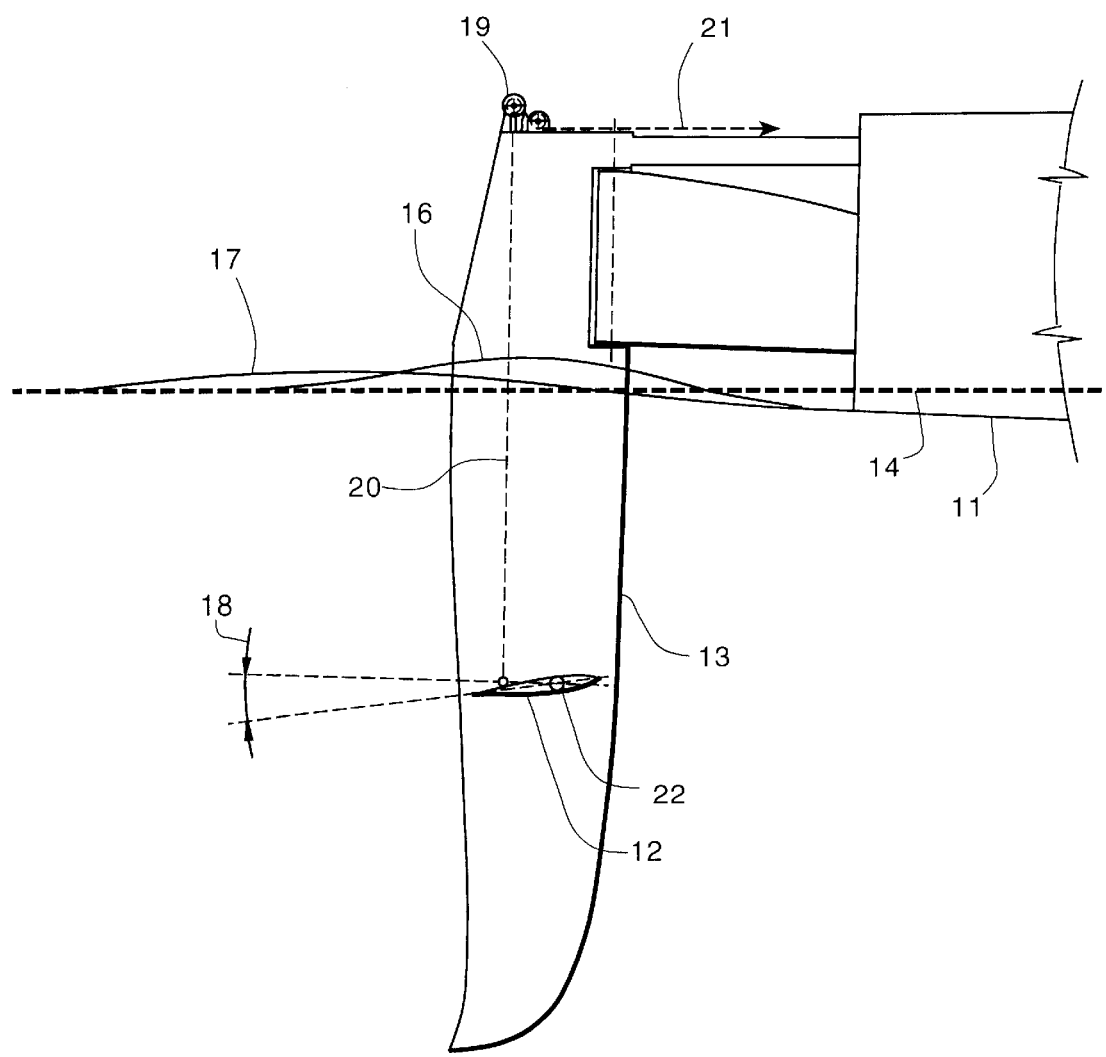
FIG. 3 shows a profile view of the invention with adjustable angle of attack.

FIG. 3 shows the preferred embodiment of the invention with adjustable hydrofoil angle of attack. In this case the foil is mounted in a steering rudder. The hydrofoil (12) is mounted on a pivot axle (22) and is actuated by a pushrod (20). This pushrod is recessed in the middle of the rudder section and is actuated by a device comprised of a sheave (19) attached to the pushrod. This sheave is actuated by a rope (21) that is led into the boat from where it can be adjusted by the crew. A cleat is provided to allow this rope to be fixed so that a hydrofoil angle of attack may be maintained. In the preferred embodiment, the pushrod is spring loaded so that it maintains pressure on the rope. There are many other possible methods of hydrofoil actuation-the assembly shown represents one possible method. A representative range of hydrofoil angles of attack is shown by note (18). Note (16) shows a representative stern wave contour without the invention fitted. Note (17) shows a representative stern wave contour with the invention fitted and adjusted to a positive angle of attack.

Figure 4:
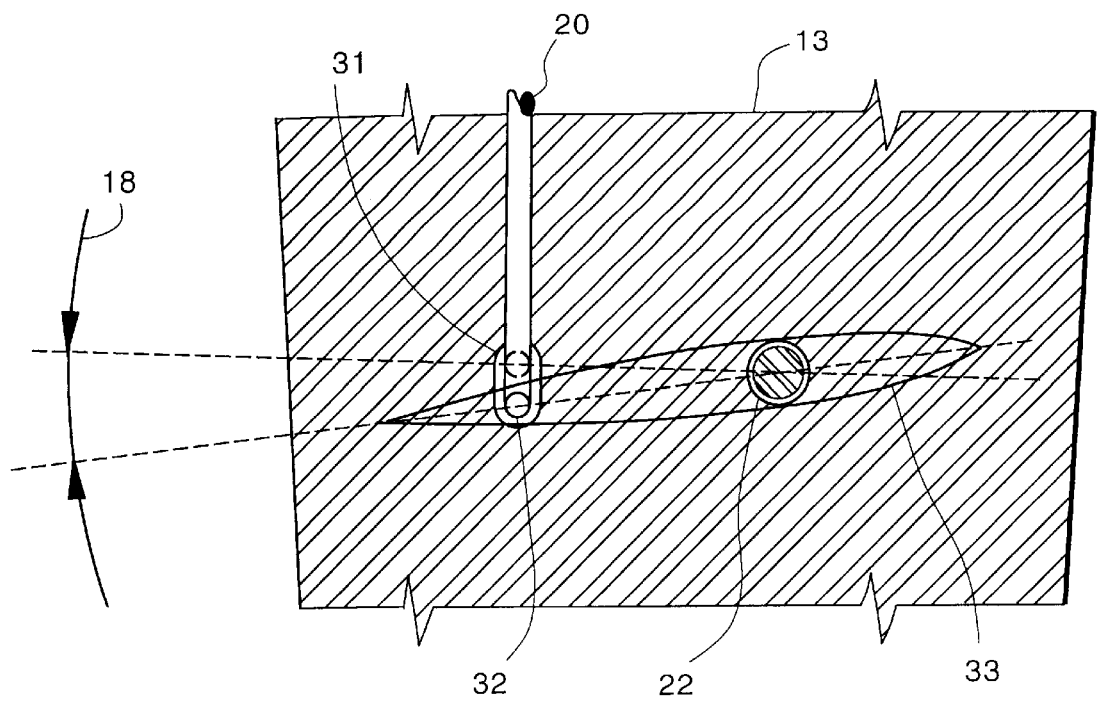
FIG. 4 shows a detail view of the hydrofoil assembly as shown in FIG. 3.

FIG. 4 shows a detail of the assembly shown in FIG. 3. In this Figure the hydrofoil section (33) is shown as symmetrical about the plane which contains the edges of the hydrofoil. It is important to note that for many applications, the preferred hydrofoil section will not be symmetrical about this plane. In addition to the features noted in FIG. 3, FIG. 4 shows the transverse pin (32) attached to the end of the pushrod. It is anticipated that the hydrofoil will be built in two halves, one on each side of the rudder (or support strut). These halves will slide onto the hydrofoil axle (22) and the transverse pin (32) and will be held in place with set screws.

Figure 5:
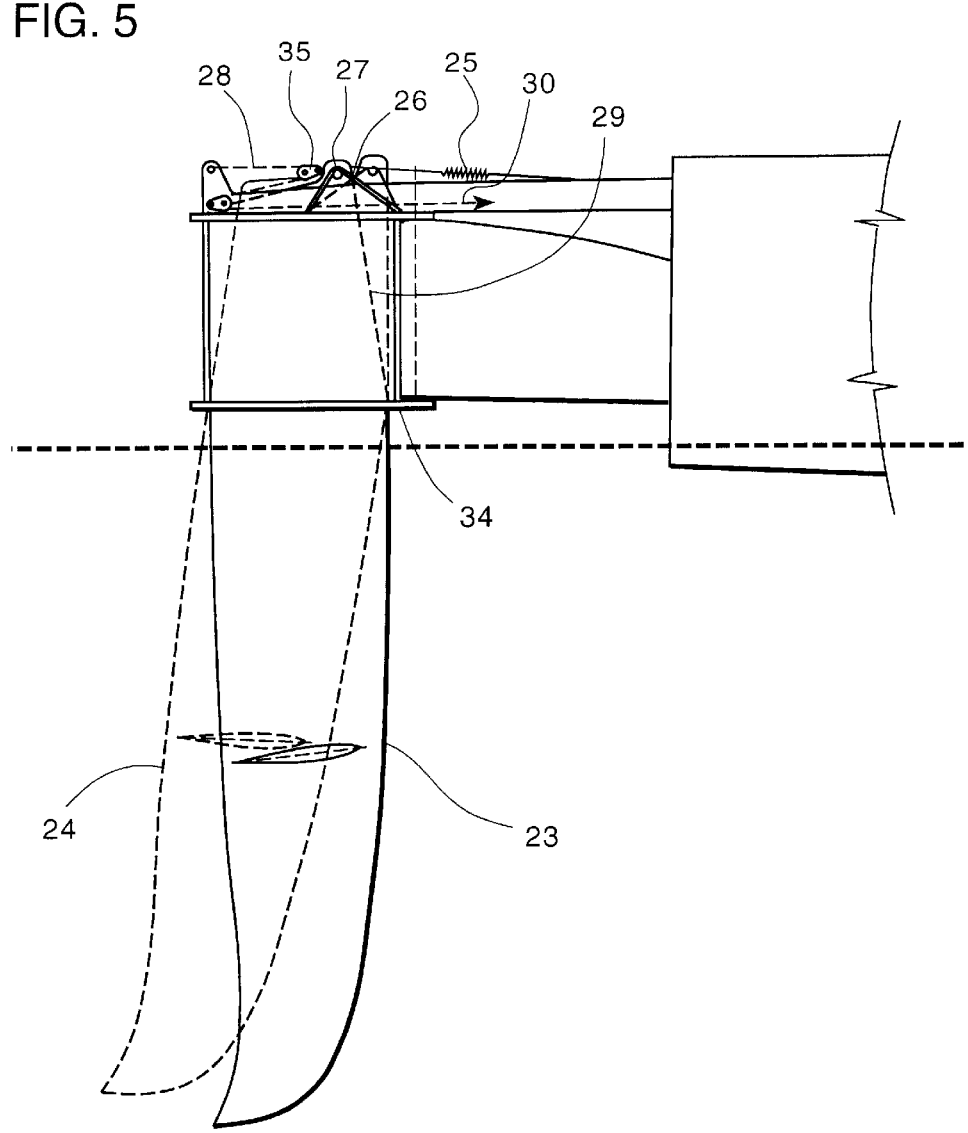
FIG. 5 shows an alternate embodiment of the invention with adjustable angle of attack.
Figure 6:
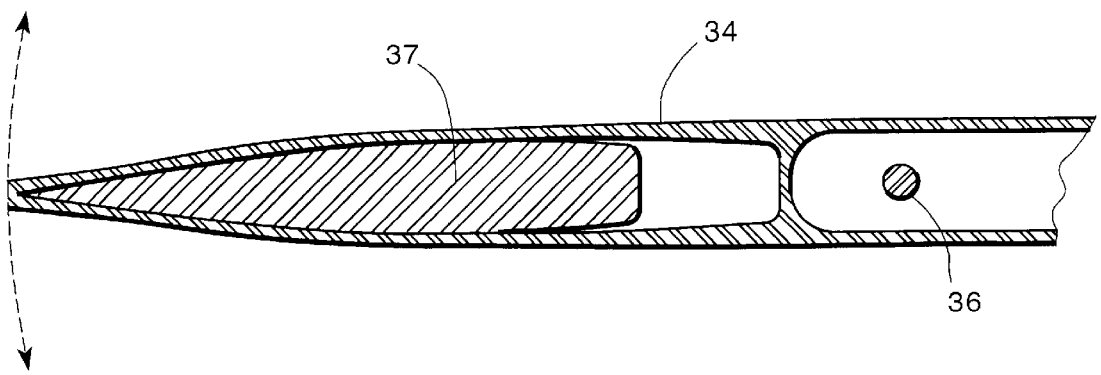
FIG. 6 shows a section through the assembly shown in FIG. 5.

FIG. 5 shows an alternate embodiment of the invention with adjustable hydrofoil angle of attack. The hydrofoil is again shown connected to a steering rudder. In this embodiment of the invention, the hydrofoil is rigidly attached to the rudder which in turn is inserted into a steering case (34). FIG. 6 shows a representative section through the case and rudder near the top of the steering case. The complete rudder/hydrofoil assembly can be rotated relative to the steering case with the intent of adjusting the hydrofoil angle of attack. Note (23) points to the rudder in the positive angle of attack (lifting) position. Note (24) points to the rudder in the negative or neutral angle of attack position. In this embodiment of the invention the forward upper section of the rudder is cut back (29) to allow clearance for the rudder to rotate between positions (23) and (24). A sheave (35) is attached to the top of the rudder. A rope (30) running through this sheave transmits force to the top of the rudder to accomplish rotation. This rope leads into the vessel to allow it to be adjusted by the crew. Some fixing method shall be fitted to allow a hydrofoil angle of attack to be maintained. A spring device (25) is fitted to maintain pressure against the adjustment rope. In order to transmit vertical forces from the rudder/hydrofoil assembly into the case, the top of the rudder is fitted with a transverse rod (27). A rope (26) loops over this pin and restrains it from large vertical movements without restraining it forward and aft within the desired range of motion.

FIG. 6 shows a section through the steering case. The pivot point (36) for rotating the steering case and rudder/hydrofoil assembly with the intention of steering the vessel is shown. A cross section of the top of the rudder (37) is also shown.

What is claimed is:

1. A hydrofoil device for reducing wake formation on a partially immersed hull of a single hulled vessel, said hydrofoil device comprising:

a transverse hydrofoil positioned below the surface of the water when said vessel is in the water, said hydrofoil being capable of a positive angle of attack of between 2 to 8 degrees to the static waterplane, the leading edge of said hydrofoil being between 5 and 15% of the immersed length of the vessel aft of the transom of said vessel, and the upper surface of said hydrofoil being between 5 and 15% of the immersed length of the vessel below the static waterplane of said vessel, a strut or multiple struts for attaching said hydrofoil to said vessel, wherein at least one of said struts is the rudder of said vessel, a means for attaching said hydrofoil to said strut or struts, and a means for attaching said strut or struts to said vessel.

2. A hydrofoil device for reducing wake formation on a partially immersed hull of a single hulled vessel, said hydrofoil device comprising:

a transverse hydrofoil positioned below the surface of the water when said vessel is in the water, said hydrofoil being capable of a positive angle of attack of between 2 to 8 degrees to the static waterplane, the leading edge of said hydrofoil being between 5 and 15% of the immersed length of the vessel aft of the transom of said vessel, and the upper surface of said hydrofoil being between 5 and 15% of the immersed length of the vessel below the static waterplane of said vessel, a strut or multiple struts for attaching said hydrofoil to said vessel, a means for attaching said hydrofoil to said strut or struts, and a means for attaching said strut or struts to said vessel, wherein said vessel is a sailboat and said hydrofoil device is mounted to said sailboat by means of a track device that allows said strut to be moved relative to the vertical axis of the transom of said sailboat such that the transverse axis of said hydrofoil may be more horizontal than when said sailboat is heeled.

3. The device of claim 1 or 2, having a positive angle of attack of between 2 to 8 degrees to the static waterplane.

4. The device of claim 1 or 2, wherein the leading edge of said hydrofoil being between 5 and 15% of the immersed length of the vessel aft of the transom of said vessel.

5. The hydrofoil of claim 1 or 2, wherein the upper surface of said hydrofoil is between 5 and 15% of the immersed length of the vessel below the static waterplane of said vessel.

6. The device of claim 1 or 2, wherein said hydrofoil has an adjustable angle of attack, relative to the static waterplane of the vessel.

7. The device of claim 1, wherein said hydrofoil device is attached to said vessel by a single strut.

8. The device of claim 1 or 2, wherein the edges of the said hydrofoil are curved and do not lie within a single plane.

9. The device of claim 1 or 2, wherein said hydrofoil reduces the wake formation of said vessel when said vessel is moving, relative to a vessel lacking said hydrofoil.

10. A vessel comprising multiple of said hydrofoil devices of claim 1 or 2, said devices mounted to a vessel such that the transverse axis of one of the said hydrofoils may be more horizontal relative to the waterplane when the vessel is heeled.

11. The vessel of claim 10, wherein said hydrofoil devices have a steering rudder as the strut such that there are multiple steering rudders on the vessel.

12. The device of claim 1 or 2, wherein said means for attaching said hydrofoil to said strut is a rotating means for the purpose of adjusting the angle of attack of said hydrofoil.

13. The device of claim 1 or 2, wherein said hydrofoil is rigidly attached to said strut and the means of attaching said strut to said hull is a rotating means for the purpose of adjusting the angle of attack of said hydrofoil.

14. The device of claim 1, wherein said vessel is a powerboat.

15. The device of claim 1, wherein said vessel is a sailboat.

16. The device of claim 1 or 2, wherein the presence of said device on said vessel allows a reduction of wake of at least 5%, relative to a vessel lacking said device when said vessel is operating in Froude numbers from about 0.3 to about 0.5.

* * * * *